United States Patent [19]

Watanabe et al.

[11] 3,965,162

[45] June 22, 1976

[54] PROCESS FOR PRODUCTION OF ACRYLIC ACID

[75] Inventors: Yoshihisa Watanabe; Makoto Imanari; Naohiro Nojiri; Nobuhiko Fuga; Masato Nakajima, all of Ami, Japan

[73] Assignee: Mitsubishi Petrochemical Company Limited, Japan

[22] Filed: Oct. 23, 1973

[21] Appl. No.: 408,291

[30] Foreign Application Priority Data
Apr. 25, 1973 Japan.............................. 48-46264

[52] U.S. Cl............................ 260/530 N; 252/432; 252/455 R; 252/457; 252/458
[51] Int. Cl.²......................................... C07C 51/32
[58] Field of Search................................ 260/530 N

[56] References Cited
UNITED STATES PATENTS

| | | | |
|---|---|---|---|
| 3,544,624 | 12/1970 | Anderson et al. ............. | 260/530 N |
| 3,557,199 | 1/1971 | Parthasarthy et al. ........... | 260/530 N |
| 3,703,548 | 11/1972 | Honda et al. ................... | 260/530 N |

*Primary Examiner*—Vivian Garner
*Attorney, Agent, or Firm*—Robert E. Burns; Emmanuel J. Lobato; Bruce L. Adams

[57] ABSTRACT

A process for production of acrylic acid by vapor phase catalytic oxidation of acrolein comprising effecting the catalytic oxidation in the presence of a catalyst comprising
1. oxides of molybdenum
2. oxides of niobium
3. oxides of silicon, and
4. oxides of elements selected from the group consisting of copper, zinc, titanium, manganese, tungsten, iron, cobalt, nickel, cadmium, gallium, mercury, thorium and boron.

7 Claims, No Drawings

PROCESS FOR PRODUCTION OF ACRYLIC ACID

BACKGROUND OF THE INVENTION

TECHNICAL FIELD

The present invention relates to a process for the production of acrylic acid by vapor phase catalytic oxidation of acrolein.

More specifically, the present invention is concerned with a process for the production of acrylic acid by vapor phase oxidation of acrolein in the presence of a catalyst primarily composed of oxides of (1) molybdenum, (2) copper, zinc, titanium, manganese, tungsten, iron, cobalt, nickel, cadmium, gallium, mercury, thorium or boron, (3) niobium and (4) silicon.

PRIOR ART

In the past, there have been proposed many catalysts for use in the production of acrylic acid by vapor phase catalytic oxidation of acrolein. Among these catalysts, the catalysts primarily composed of a combination of molybdenum and vanadium in the form of an oxide exhibit a relatively good performance, and thus a great variety of these catalysts are known. Although these catalysts may provide fairly good results, it is to be understood that they are not completely satisfactory. For example, in the process disclosed in Japanese Patent Publication No. 1775/1966, the catalyst disclosed is composed of oxides of molybdenum and vanadium deposited on silica gel, and the highest single-pass yield of acrylic acid at a reaction temperature of 300°C according to this reference is 76% based on the acrolein fed. As a consequence, it seems that there is still room for further improvement in both activity and selectivity of the catalyst.

Japanese Patent Publication No. 26287/1969 discloses a catalyst species primarily composed of oxides of molybdenum, vanadium and aluminum deposited on an aluminum sponge. This catalyst is known to show extremely good activity and selectivity when it is treated with a gaseous raw material prior to use. However, in order to ensure that a stable production of the catalyst is carried out on an industrial scale, particular considerations are needed since the catalyst must be subjected to activation treatment and since an aluminum sponge which is relatively difficult to produce must be used as a carrier.

Further, examples of catalysts composed of molybdenum and niobium are disclosed in Japanese Patent Publication Nos. 4855/1970, 12724/1970, and 18013/1971. However, these catalysts also seem to possess room for further improvement in both activity and selectivity for practical use.

SUMMARY OF THE INVENTION

The applicants have made studies to remove the aforementioned disadvantages and to provide a new catalyst suitable for the production of acrylic acid by oxidation of acrolein which is excellent in activity and selectivity, is easy to use for industrial purposes, and, further, is simple to produce. As a result, they have, unexpectedly, discovered that catalysts composed of oxides of (1) Mo. (2) Cu, Zn, Ti, Mn, W, Fe, Co, Ni, Cd, Ga, Hg, Th, or B, (3) Nb, and (4, Si have extremely excellent activity and selectivity and have thereby arrived at this invention.

Therefore, the process for the production of acrylic acid according to the present invention is characterized in that vapor phase catalytic oxidation of acrolein is carried out in the presence of a catalyst composed of oxides of (1) molybdenum, (2) at least one metal selected from the group consisting of vanadium, copper, zinc, titanium, manganese, tungsten, iron, cobalt, nickel, cadmium, gallium, mercury, thorium, and boron, (3) niobium and (4) silicon.

In accordance with the present invention, another process for the production of acrylic acid by vapor phase catalytic oxidation of acrolein is characterized in that the catalytic oxidation is carried out in the presence of a catalyst composed of oxides of molybdenum, niobium, vanadium, and silicon, the ratio of molybdenum, niobium and vanadium (based on gram atom percent) being within a hexagonal region bounded by two straight lines respectively representing 10% and 90% molybdenum, 0.01% and 70% niobium, and 0.01% and 60% vanadium, respectively, in the triangular composition diagram shown in the accompanying drawing.

DETAILED DESCRIPTION

The catalyst used in the process of the present invention possesses extremely good performance. For example, when acrolein was oxidized by air at a temperature of 250°C in the presence of a catalyst deposited on a porous α-alumina (manufactured by Fujimi Kenmazai K.K.), and containing molybdenum, niobium, iron, copper and silicon in the atomic ratio of 10 : 7 : 1 : 1 : 12.5 constituting 28.4% by weight of the total catalytic composite, acrylic acid was obtained with high yield. The conversion of acrolein and the selectivity to acrylic acid was 96.6% and 93.8%, respectively.

Although the reason why such catalysts composed of the four types of oxide exhibit surprisingly better performance than catalysts composed of two elements, that is, molybdenum-copper and the like or molybdenum-niobium is not known with certainty, it may be inferred that heating of a mixture of molybdenum compound, copper compound or a compound of another of the element (2) and niobium compound results in formation of a ternary oxide compound distinctivity different from those compounds as produced from either of the binary component system. In particular, it is essential that silicon be included in the catalyst of the present invention. To be exact, it may be presumed that the four elements of molybdenum, copper and the others, niobium and silicon constitute a polycompound consisting of their respective oxides.

The catalyst used in the process of the present invention is not only excellent in performance as described hereinabove but can be readily prepared as described hereinafter. The mechanical strength of the catalyst after pelletizing is sufficiently high.

Further, due to its high activity, only a small amount of the catalyst need be deposited on a porous carrier so as to obtain satisfactory results. Accordingly, the catalyst of the present invention is advantageous from both the mechanical strength and cost standpoints.

1. Catalyst
1. Preparation

The catalyst used in the process of the present invention may be prepared by any of the known methods of multi-metal oxide catalyst preparation. In general, it is preferable to adopt a method comprising forming aqueous solutions or suspensions respectively of the compounds, particularly water soluble compounds, of molybdenum, copper and the others, and niobium which are ordinarily decomposed to the respective metal oxides by heating and mixing the solutions or suspensions in sequence or simultaneously. Alternatively, the solid, soluble starting compounds are dissolved in a single solution.

For example, the catalyst of the invention may be prepared according to the following procedure.

Compounds of (1) molybdenum (2) at least one of copper, zinc, titanium, manganese, tungsten, iron, cobalt, nickel, cadmium, gallium, mercury, thorium, or boron, and niobium such as ammonium paramolybdate, ammonium metavanadate; niobium chloride, niobium oxalate, niobium oxide or niobium hydroxide; and nitrates, organic acid salt, halides, hydroxides and the like, of copper, zinc, titanium, manganese, tungsten, iron, cobalt, nickel, cadmium, gallium, mercury, or thorium, are mixed, or these compounds are preferably dissolved in suitable solvents to form a homogeneous solution. Silica sol or silica gel is uniformly dispersed in the resulting solution while stirring. It is preferred that one or more elements selected from the group consisting of vanadium, copper, zinc, titanium, manganese, tungsten, iron, cobalt, nickel, cadmium, gallium, mercury, thorium and boron are added. In particular, boron may be added in the form of borates of metals other than boron. The resulting mixture or slurry is then evaporated to dryness. The solid cake thus produced is pulverized. The resulting powder with or without pelletizing is thermally decomposed at a temperature of from 300°C to 500°C. The heat-treated powder is pelleted or it is placed in a mill in a predetermined amount and thoroughly crushed with the addition of water. Following this, the crushed powder particles are deposited on a carrier such as porous alumina or silicon carbide and fired at a temperature of from 300°C to 600°C for the prescribed period. The catalyst thus produced can further be processed into tablets, discs or other suitable catalyst forms. The above-described solution or suspension of compounds of the catalyst constituents may include ammonia, amine, volatile organic compounds and other supplementary materials.

The finally fired catalyst is considered to be a mixture or compound of the oxides of (1) molybdenum, (2) at least one of copper, zinc, titanium, manganese, tungsten, iron, cobalt, nickel, cadmium, gallium, mercury, thorium or boron, (3) niobium and (4) silicon, but the exact structure of the catalyst is not known with any degree of certainty.

Thus, it seens advisable to call the catalyst "a catalytic active composition composed of oxides of the specified metals" or "a catalytic complex composed of the specified metals".

2. Catalyst composition

Although the compositional structure of the catalyst according to the present invention is not clear, the catalyst comprises copper, zinc, titanium, manganese, tungsten, iron, cobalt, nickel, cadmium, gallium, mercury, thorium and/or boron in 0.001 to 60, preferably 0.1 to 50, most preferably 0.1 to 10 atoms (total) and the quantity of niobium is 0.001 to 70, preferably 0.1 to 60, most preferably 0.5 to 60 atoms per 10 atoms of molybdenum. The catalyst contains 2.5 to 500 atoms of silicon.

The most typical catalysts in accordance with the present invention are those having a composition: molybdenum 10 atoms, the elements (2) from about 0.5 to about 10 atoms, niobium from about 5 to about 30 atoms, and silicon from about 5 to about 30 atoms as demonstrated in the following Examples.

2. Catalytic vapor-phase oxidation of acrolein

The catalytic oxidation reaction of the present invention is ordinarily carried out at a temperature of from 200°C to 350°C, preferably from 210°C to 330°C, and at a pressure of from 0.5 to 10 atmospheres, gauge.

The contact time of a mixture of acrolein, molecular oxygen (preferably, air) and a diluent/preferably, steam, with the catalyst is suitably from 0.5 to 10 seconds.

The mole ratios of ingredients in a gaseous feed mixture are from 0.5 to 4 moles of molecular oxygen and from 1 to 20 moles of steam per mole of acrolein.

In general, air is used as the source of molecular oxygen. However, pure oxygen per se or mixtures of oxygen and inert gases such as carbon dioxide, nitrogen, etc. may also be used.

Except for the use of the specific catalysts as described hereinabove, the process of vapor phase catalytic oxidation of acrolein according to the present invention is substantially identical to that ordinarily employed in the prior art.

EXAMPLE 1

35.3g of ammonium paramolybdate [$(NH_4)_6Mo_7O_{24}\cdot 4H_2O$] was dissolved in distilled water with heating. To the solution were added 22.5g of niobium hydroxide [$Nb(OH)_n$·82.8% by weight in terms of $Nb_2O_5$], 3.6g of ferrous oxalate [$FeC_2O_4\cdot 2H_2O$], and 1.98g of cuprous chloride [$CuCl$]. Then 75g of an aqueous silica sol (containing 20% by weight of $SiO_2$, available under the trade name "Snow Tex N") was added. The resulting mixture was evaporated to dryness with stirring. The powder so formed was thermally decomposed at 350°C for one hour. To 25g of the powder was added 25 ml of distilled water, and the resulting slurry was thoroughly wet milled completely in a mill. The slurry was removed from the mill and was deposited on 50g of a spherical, porous α-alumina carrier having an external diameter of 5 mm (manufactured by Fujimi Kenmazai K.K., Japan). After drying, the supported catalyst was fired in a muffle furnace at a temperature of 380°C for 5 hours.

The catalyst so obtained had a composition comprising molybdenum, niobium, iron, copper and silicon in an atomic ratio of 10 : 7 : 1 : 1 : 12.5, and this catalyst constituted 28.4% by weight of the total catalytic composite.

20 ml of this catalyst was placed in a stainless steel reactor tube of 15 mm inner diameter.

A gaseous mixture of 3.6% acrolein, 46% air, 41% steam and 9.4% nitrogen (by volume) was passed over the catalyst with a contact time of 4.3 seconds (calculated in terms of NTP) at a temperature of 250°C and under atmospheric pressure.

The results of the reaction were as follows:

|  | Percent |
| --- | --- |
| Conversion of acrolein | 96.6 |
| Selectivity to acrylic acid | 93.8 |
| Single pass yield of acrylic acid | 90.6 |

In addition, acetaldehyde, acetic acid, carbon monoxide and carbon dioxide were by-produced.

COMPARATIVE EXAMPLE 1

A catalyst having a composition of Mo - Nb - Si (10 : 7 : 12.5) and containing no component (2) was prepared according to the procedure described in Example 1.

The catalytic oxidation of acrolein with this catalyst was carried out under the same reaction conditions as those set forth in Example 1 except that the reaction temperature was 270°C.

The results of the reaction were as follows:

|  | Percent |
| --- | --- |
| Conversion of acrolein | 95.7 |
| Selectivity to acrylic acid | 72.4 |
| Single pass yield of acrylic acid | 69.2 |

In addition, acetaldehyde, acetic acid, carbon monoxide and carbon dioxide were by-produced.

COMPARATIVE EXAMPLE 2

In this example, the same catalyst as in Comparative Example 1 was used except that the firing temperature was 450°C.

The catalytic oxidation of acrolein with this catalsyt was carried out under the same reaction conditions as those set forth in Example 1 except that the reaction temperature was 250°C.

|  | Percent |
| --- | --- |
| Conversion of acrolein | 84.8 |
| Selectivity to acrylic acid | 80.2 |
| Single pass yield of acrylic acid | 68.1 |

In addition, acetaldehyde, acetic acid, carbon monoxide and carbon dioxide were by-produced.

EXAMPLES 2 – 29

Various catalysts were prepared according to the procedure set forth in Example 1 except that the kind and amount of the components (2) and the firing temperature were varied.

The catalytic oxidation of acrolein with each of these catalysts was carried out under the same conditions as those specified in Example 1. The catalysts are represented by Mo - Nb - Si - X, and the atomic ratio of Mo : Nb : Si was 10 : 7 : 12.5. The results of these reactions are shown in Table 1.

In view of Table 1, it is apparent that the components X result in appreciable advantages as compared with Comparative Examples 1 and 2. Further, comparison of the catalyst fired at 450°C with the catalyst of Comparative Example 2 in performance indicates that the components X are useful for the improvement in thermal resistance of the catalyst.

EXAMPLES 30 – 31 AND COMPARATIVE EXAMPLES 3 – 5

Even when the composition of Mo - Nb - Si was varied, the components (2) provided similar results as is shown in the following Table 2.

Table 1

| Example No. | X | Firing temperature (°C) | Amount of the catalyst supported (%) | Reaction temperature (°C) | Percent conversion of acrolein | Percent selectivity to acrylic acid | Percent single-pass yield of acrylic acid | Form of the salt added |
| --- | --- | --- | --- | --- | --- | --- | --- | --- |
| 2 | Zn 1 | 380 | 28.8 | 270 | 97.9 | 91.9 | 89.9 | $Zn(NO_3)_2 \cdot 6H_2O$ |
| 3 | Zn 3 | 380 | 26.1 | 270 | 98.6 | 84.7 | 83.5 | " |
| 4 | B 1 | 380 | 30.2 | 270 | 96.0 | 87.6 | 84.0 | $H_3BO_3$ |
| 5 | B 3 | 380 | 29.7 | 270 | 95.3 | 92.7 | 88.4 | " |
| 6 | B 5 | 380 | 29.5 | 270 | 95.0 | 91.5 | 86.9 | " |
| 7 | Cu 0.5 | 380 | 29.1 | 270 | 97.7 | 88.6 | 86.5 | CuCl |
| 8 | Cu 1 | 380 | 28.1 | 250 | 95.0 | 92.4 | 87.8 | " |
| 9 | Cu 1 | 450 | 29.9 | 270 | 95.0 | 92.7 | 88.1 | " |
| 10 | Fe 1 | 400 | 30.5 | 230 | 97.6 | 87.7 | 85.5 | $FeC_2O_4 \cdot 2H_2O$ |
| 11 | Fe 3 | 380 | 27.0 | 250 | 94.2 | 87.2 | 82.2 | " |
| 12 | Fe 1 | 400 | 31.8 | 230 | 91.2 | 89.2 | 81.4 | $FeCl_2 \cdot 4H_2O$ |
| 13 | Fe 1 | 400 | 30.5 | 250 | 95.4 | 84.8 | 81.0 | $FeSO_4 \cdot 7H_2O$ |
| 14 | Fe 1 | 400 | 30.4 | 250 | 94.2 | 87.2 | 82.1 | $Fe(OAc)_2 \cdot 4H_2O$ |
| 15 | Fe 1 | 400 | 30.2 | 250 | 96.6 | 83.6 | 80.8 | $Fe(NO_3)_3 \cdot 9H_2O$ |
| 16 | Co 1 | 380 | 29.0 | 250 | 96.0 | 85.4 | 82.0 | $Co(NO_3)_2 \cdot 6H_2O$ |
| 17 | Co 1 | 450 | 26.8 | 270 | 95.9 | 86.3 | 82.3 | " |
| 18 | Ni 1 | 380 | 28.2 | 270 | 88.3 | 89.3 | 78.8 | $Ni(NO_3)_2 \cdot 6H_2O$ |
| 19 | Mn 1 | 380 | 32.9 | 250 | 89.7 | 87.2 | 78.2 | $Mn(NO_3)_2 \cdot 6H_2O$ |
| 20 | Ti 1 | 380 | 29.0 | 270 | 97.5 | 80.0 | 78.0 | $Ti(OH)n$ |
| 21 | Ti | 450 | 26.4 | 270 | 96.4 | 81.3 | 78.3 | " |

Table 1-continued

| Example No. | X | | Firing temperature (°C) | Amount of the catalyst supported (%) | Reaction temperature (°C) | Percent conversion of acrolein | Percent selectivity to acrylic acid | Percent single-pass yield of acrylic acid | Form of the salt added |
|---|---|---|---|---|---|---|---|---|---|
| 22 | Hg | 1 | 380 | 28.8 | 250 | 97.0 | 80.3 | 78.0 | $HgCl_2$ |
| 23 | Hg | 3 | 380 | 29.5 | 230 | 97.0 | 81.3 | 78.8 | " |
| 24 | Ga | 10 | 380 | 26.3 | 270 | 97.8 | 80.2 | 78.5 | $GaCl_3$ |
| 25 | Th | 1 | 380 | 28.9 | 270 | 96.4 | 81.5 | 78.7 | $Th(NO_3)_4 \cdot 4H_2O$ |
| 26 | Cd | 1 | 380 | 30.1 | 270 | 96.6 | 81.2 | 78.3 | $Cd(NO_3)_2 \cdot 4H_2O$ |
| 27 | Hg Cu | 1 | 380 | 25.7 | 250 | 97.8 | 92.6 | 90.5 | $HgCl_2$ CuCl |
| 28 | Zn Cu | 2 | 380 | 25.8 | 270 | 98.2 | 90.9 | 89.2 | $ZnCl_2$ CuCl |
| 29 | W | 1 | 450 | 30.6 | 270 | 96.0 | 78.0 | 74.9 | $5(NH_4)_2 12WO_3 \cdot 5H_2O$ |

Table 2

| No. | Catalyst composition | | | | Amount of the catalyst supported (%) | Reaction temperature (°C) | Percent conversion of acrolein | Percent selectivity to acrylic acid | Percent single-pass yield of acrylic acid |
|---|---|---|---|---|---|---|---|---|---|
| | Mo | Nb | Si | Cu | | | | | |
| Comparative Ex. 3 | 5 | 12 | 12.5 | — | 31.0 | 270 | 56.7 | 75.4 | 42.7 |
| Example 29 | 5 | 12 | 12.5 | 1 | 28.1 | 270 | 64.2 | 86.9 | 55.8 |
| Comparative Ex. 4 | 7 | 10 | 12.5 | — | 33.4 | 270 | 95.6 | 69.6 | 66.5 |
| Example 30 | 7 | 10 | 12.5 | 1 | 24.9 | 270 | 95.0 | 91.6 | 87.0 |
| Comparative Ex. 5 | 12 | 5 | 12.5 | — | 30.6 | 270 | 87.5 | 74.9 | 65.5 |
| Example 31 | 12 | 5 | 12.5 | 1 | 26.6 | 270 | 98.4 | 90.2 | 88.7 |

What we claim is:

1. A process for producing acrylic acid which comprises subjecting acrolein to catalytic vapor-phase oxidation with molecular oxygen over an oxidation catalyst consisting essentially of oxides of (1) molybdenum, (2) at least one member selected from the group consisting of copper, zinc, titanium, manganese, tungsten, iron, cobalt, nickel, cadmium, gallium, mercury, thorium and boron, (3) niobium, and (4) silicon at a temperature of from 200°C to 350°C and under a pressure of from 0.5 atmosphere to 10 atmospheres, gauge; in which the atomic ratio of the oxides of the metals of said catalyst is: element (1) 10, element (2) from 0.001 to 60, element (3) from 0.001 to 70, and element (4) from 2.5 to 500.

2. A process for producing acrylic acid as claimed in claim 1 in which the atomic ratio of the oxides of the metals of said catalyst is: the element (1), 10, the element (2) from 0.1 to 50, the element (3) from 0.1 to 60, and the element (4) 2.5 to 500.

3. A process for producing acrylic acid as claimed in claim 1 in which the atomic ratio of the oxides of the metals of said catalyst is: the element (1) 10, the element (2) 0.1 to 10, the element (3) 0.5 to 60, and the element (4) 2.5 to 500.

4. A process for producing acrylic acid as claimed in claim 1 in which the atomic ratio of the oxides of the metals of said catalyst is: the element (1) 10, the element (2) from about 0.5 to about 10 atoms, the element (3) from about 5 to 30, and the element (4) from about 5 to about 30 atoms.

5. A process for producing acrylic acid as claimed in claim 1 in which element (2) is a mixture of iron and copper.

6. A process for producing acrylic acid as claimed in claim 1 in which element (2) is a mixture of mercury and copper.

7. The process for producing acrylic acid as claimed in claim 1 in which element (2) is zinc and copper.

* * * * *